United States Patent Office 2,849,397
Patented Aug. 26, 1958

2,849,397

SILVER PHOSPHATES AS WEAR-REDUCING AGENTS

Bruce W. Hotten, Orinda, Calif., assignor to California Research Corporation, San Francisco, Calif., a corporation of Delaware No Drawing. Application December 28, 1955
Serial No. 555,748

9 Claims. (Cl. 252—32.5)

This invention relates to lubricating oil compositions having certain particular metal dialkyl phosphates incorporated therein as wear-reducing agents.

In the proper lubrication of hypoid gears, bearing surfaces, metal cutting tools and the like subjected to unusually heavy loads per unit area of bearing surface, it is of particular benefit to use lubricating oil compositions containing wear-reducing agents. It is well known in the art that mineral oil lubricants containing added metallic soaps such as lead soaps, and/or sulfurized fatty acids or fatty oils, such as sulfurized animal or vegetable oils, are used for decreasing wear or decreasing coefficients of friction in lubricating compositions. Other wear-reducing compositions include mineral lubricating oils (either alone or in admixture with fatty oils) to which have been added sulfur in elemental or uncombined form. However, certain defects arise in the use of the agents in the foregoing compositions in that they tend to cause gumming of the metal parts; and certain of them tend to separate into their constituent parts upon long continuous subjection to severe operating conditions, resulting in severe corrosion to metals.

In accordance with the invention, I have discovered that certain silver dialkyl phosphates are extremely effective in reducing wear in lubricating oil compositions.

The particular silver dialkyl phosphates which are effective according to the present invention as wear-reducing agents in lubricating oil compositions have the following formula:

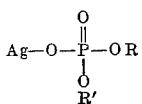

wherein R and R' are alkyl radicals containing from 12 to 22 carbon atoms. The R and R' may be alike or they may be different; that is, R for example may contain 12 carbon atoms, and R' may contain 18 carbon atoms. However, the total number of carbon atoms in the alkyl radicals of the silver dialkyl phosphate is from 24 to 44.

Examples of the silver phosphates useful in the compositions of this invention include silver didodecyl phosphate, silver dihexadecyl phosphate, silver dioctadecyl phosphate, silver dodecyl octadecyl phosphate, silver hexadecyl octadecyl phosphate, etc.

Lubricating oils which are suitable base oils for the compositions of this invention include a wide variety of lubricating oils, such as naphthenic base, paraffin base, and mixed base; other hydrocarbon lubricants, e. g., lubricating oils derived from coal products; and synthetic oils, e. g., alkylene polymers, such as polymers of propylene, butylene, etc., and mixtures thereof; alkylene oxide type polymers, dicarboxylic acid esters, liquid esters of acid of phosphorus, alkylbenzene polymers, etc. Synthetic oils of the alkylene oxide type polymers which may be used include those exemplified by the alkylene oxide type polymers (e. g., propylene oxide polymers and derivatives thereof), including alkylene oxide polymers prepared by polymerizing the alkylene oxides, e. g., propylene oxide, in the presence of water or alcohols, e. g., ethyl alcohol; esters of ethylene oxide type polymers, e. g., acetylated propylene oxide polymers prepared by acetylating propylene oxide polymers containing hydroxyl groups; polyethers prepared from the ethylene glycols, e. g., ethylene glycol, etc.

The polymeric products prepared from the various alkylene oxides and alkylene glycols may be polyoxyalkylene or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dicarboxylic acid ester synthetic oils include dibutyl adipate, dihexyl adipate, and di-2-ethylhexyl sebacate, etc.

Synthetic oils of the alkylbenzene type include those which are prepared by alkylating benzene, e. g., dodecyl benzene, tetradecyl benzene, etc.

Although phosphates in general have been described in the art as lubricating oil additives, it was entirely unexpected that the particular silver dialkyl phosphates of this invention should be found to be effective in reducing wear in lubricating oil compositions. As noted from the data set forth hereinbelow in Table I, metal salts of phosphoric acids broadly are not equivalent in their effectiveness as antiwear agents in lubricating oil compositions. For example, the data presented in Table I show that the particular class of silver dialkyl phosphates of this invention is surprisingly and unexpectedly superior to lead dialkyl phosphates, alkaline earth metal dialkyl phosphates, and other silver metal salts as wear reducing agents in lubricating oil compositions.

A method of preparing silver dialkyl phosphates is set forth as follows: an aqueous solution of an alkali metal salt of the desired dialkyl phosphoric acid ester is first prepared by reacting an aqueous alcohol solution of the dialkyl phosphate with an alkali metal hydroxide (e. g., potassium hydroxide). An aqueous solution of silver nitrate is then added to the solution of the alkali metal phosphate, precipitating the silver salt therefrom. The precipitated silver dialkyl phosphate is then dried for use as a wear-reducing agent in lubricating oil compositions.

The effectiveness of the silver dialkyl phosphates of this invention as wear-reducing agents was determined by a Falex test, which is described in "Journal of the Institute of Petroleum," vol. 32, April 1946. The test assembly consists of a steel rod inserted between two steel V-shaped bearing blocks. The assembly of bearing blocks and rod is immersed in the lubricating oil being tested. The rod is rotated and, as the rod rotates, progressively increasing pressure is applied upon the rod by the V-shaped bearing blocks until seizure occurs. The numerical figures which are presented hereinbelow in Table I are the recorded Falex values at which seizure occurred; that is, the loads under which the particular lubricating compositions failed. The value of 4500+ pounds which was obtained with a lubricating oil composition containing a silver dialkyl phosphate is an extremely unusual and unexpected value. It is one of the highest values recorded by this particular Falex test.

The data of Table I hereinbelow were obtained with lubricating oil compositions containing 5% of the listed additives. The base lubricating oils consisted of ⅔ by volume of a California solvent-refined paraffin base oil having a viscosity of 185 SSU at 100° F. and ⅓ by volume of a California paraffin base oil having a viscosity of 150 SSU at 100° F. The Falex value for failure (i. e., at seizure) of the base oil was 1600 pounds.

TABLE I

| Additive | Falex test load at failure (lbs.) |
| --- | --- |
| 1. Silver naphthenate | 2,450 |
| 2. Silver dodecylbenzene sulfonate | 2,050 |
| 3. Silver petroleum white oil phosphonate | 1,900 |
| 4. Silver dihexadecyl phosphate | 4,500+ |
| 5. Calcium dihexadecyl phosphate | 2,250 |
| 6. Lead dihexadecyl phosphate | 2,400 |

The preparation of silver dialkyl dithiophosphates is illustrated in Example 1 hereinbelow.

*Example 1.—Preparation of silver dihexadecyl phosphate*

100 grams (0.2 mole) of dihexadecyl phosphate was added to a solution consisting of 11.2 grams (0.2 mole) potassium hydroxide, 100 ml. 95% ethanol, and 100 ml. water. This mixture was heated to 150° F. until a clear solution of potassium dihexadecyl phosphate was obtained. To the above solution was added a solution of 34 grams of silver nitrate in 100 ml. water. The resulting precipitate of silver dihexadecyl phosphate was water washed and dried.

The silver dialkyl phosphates herein are used in lubricating oil compositions in amounts sufficient to inhibit wear. Where unusually high pressures are encountered between metal surfaces, silver dialkyl phosphates per se can be used as lubricants. On the other hand, it may be desirable to incorporate a lubricating oil or other component as a carrier or diluent for the phosphate. Because of the wear reduction obtained in lubricating compositions, silver dialkyl phosphates can be present in lubricating compositons in minor amounts; that is, in amounts from 0.1% to 10%, by weight, preferably from 2% to 7%, by weight.

By the use of the term "lubricating compositions" herein, it is intended to include the use of silver dialkyl phosphates in grease compositions, that is, in compositions wherein lubricating oils are thickened with grease thickening agents (e. g., lithium hydroxystearate, sodium stearate, aluminum hydroxybenzoate stearate, bentonite, etc.).

Silver dialkyl phosphates do not thicken lubricating oils to the consistency of greases.

I claim:
1. A lubricating oil composition comprising a major proportion of an oil of lubricating viscosity and, in an amount sufficient to inhibit wear in said lubricating oil composition, a silver dialkyl phosphate containing a total of 24–44 carbon atoms in the alkyl radicals.

2. A lubricating oil composition comprising a major proportion of an oil of lubricating viscosity and, in an amount sufficient to inhibit wear in said lubricating oil composition, a silver dialkyl phosphate having from 12–22 carbon atoms in each alkyl radical.

3. A lubricating oil composition comprising an oil of lubricating viscosity and from about 0.1% to about 10%, by weight, of a silver dialkyl phosphate, wherein each alkyl radical contains from 12–22 carbon atoms.

4. A lubricating oil composition comprising an oil of lubricating viscosity and from about 2% to about 7%, by weight, of a silver dialkyl phosphate having from 12–22 carbon atoms in each alkyl radical.

5. A lubricating oil composition comprising a petroleum lubricating oil and from about 0.1% to about 10%, by weight, of a silver dialkyl phosphate, wherein each alkyl radical contains from 12–22 carbon atoms.

6. A lubricating oil composition comprising a petroleum lubricating oil and from about 2% to about 7%, by weight, of a silver dialkyl phosphate, wherein each alkyl radical contains from 12–22 carbon atoms.

7. A lubricating oil composition comprising a major proportion of a petroleum lubricating oil and from about 0.1% to about 10%, by weight, of silver didodecyl phosphate.

8. A lubricating oil composition comprising a major proportion of a petroleum lubricating oil and from about 2% to about 7%, by weight, of silver didodecyl phosphate.

9. A lubricating oil composition consisting essentially of a petroleum lubricating oil and 5%, by weight, of silver didodecyl phosphate.

References Cited in the file of this patent

UNITED STATES PATENTS

| 2,274,302 | Mulit | Feb. 24, 1942 |
| 2,341,565 | Lyman | Feb. 15, 1944 |
| 2,346,155 | Denison | Apr. 11, 1944 |